United States Patent [19]

Simpson et al.

[11] Patent Number: 5,838,393
[45] Date of Patent: Nov. 17, 1998

[54] AUDIO/VIDEO/CONTROL REMOTE SWITCHING DEVICE

[75] Inventors: Stuart Richard Simpson, Northridge; Leonid Abramovich Grabovetsky, Santa Monica, both of Calif.

[73] Assignee: StarGrabber LLC, Van Nuys, Calif.

[21] Appl. No.: 631,536

[22] Filed: Apr. 12, 1996

[51] Int. Cl.$^6$ .................................................. H04N 5/268
[52] U.S. Cl. ...................... 348/705; 340/825.25; 360/61; 386/65
[58] Field of Search ..................................... 348/705, 706, 348/725, 8, 12, 13, 734, 512; 340/825.24, 825.25; 386/60, 61, 62, 65; H04N 5/268

[56] References Cited

U.S. PATENT DOCUMENTS

| | | | |
|---|---|---|---|
| 4,675,757 | 6/1987 | Block | 386/65 |
| 4,855,730 | 8/1989 | Venners et al. | 340/825.25 |
| 5,054,022 | 10/1991 | Van Steenbrugge | 348/706 |
| 5,255,097 | 10/1993 | Spiero et al. | 348/706 |
| 5,327,296 | 7/1994 | Nagasawa | 386/65 |
| 5,414,417 | 5/1995 | Heo | 340/825.25 |

*Primary Examiner*—Sherrie Hsia
*Attorney, Agent, or Firm*—Merchant, Gould, Smith, Edell, Welter & Schmidt

[57] ABSTRACT

An audio/video/control switching apparatus comprised of a plurality of switching subsystems. Each of the switching subsystems allows an operator to select an input signal from among a first plurality of inputs, to select an output signal from a second plurality of outputs, and to couple the selected input signal to the selected output signal. In the preferred embodiment, each of the switching subsystems handles a different one of a plurality of signal types, such as composite video signals, S-video signals, audio signals, time code signals, and control signals. A control panel is coupled to the switching subsystems, so that the operator can control the selection of the input and output signals. The apparatus also includes a circuit that enables the switching subsystems only when the selected input signal is not coupled to an identical device as the selected output signal.

8 Claims, 3 Drawing Sheets

AUDIO/VIDEO/CONTROL REMOTE SWITCHING DEVICE

BACKGROUND OF THE INVENTION

1. Field of the Invention.

This invention relates in general to video-editing systems, and in particular to an switching device for selecting among remote input and output audio, video, and control devices.

2. Description of Related Art.

Video editing systems for use in post-production studios typically use various source devices and destination devices. Source devices may provide a variety of signals, including video signals, audio signals, and control signals. In order to provide signals from a source device, such as a video tape player, to a destination device, such as a video tape recorder, separate switches are required for each of the signals, audio and control, for example, generated by the video tape player. Existing routing or switching systems, however, require the operator to manually coordinate the switching of the video, audio, and control signals. Thus, there is a need in the art for an improved switching system that enables an operator to select with the touch of a button a source device and a destination device and have all the signals of the source device automatically provided to the destination device.

SUMMARY OF THE INVENTION

To overcome the limitations in the prior art described above, and to overcome other limitations that will become apparent upon reading and understanding the present specification, the present invention discloses an audio/video/control switching apparatus comprised of a plurality of switching subsystems. Each of the switching subsystems allows an operator to select an input signal from among a first plurality of inputs, to select an output signal from a second plurality of outputs, and to couple the selected input signal to the selected output signal. In the preferred embodiment, each of the switching subsystems handles a different one of a plurality of signal types, such as composite video signals, S-video signals, audio signals, time code signals, and control signals. A control panel is coupled to the switching subsystems, so that the operator can control the selection of the input and output signals. The apparatus also includes a circuit that enables the switching subsystems only when the selected input signal is not coupled to an identical device as the selected output signal.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
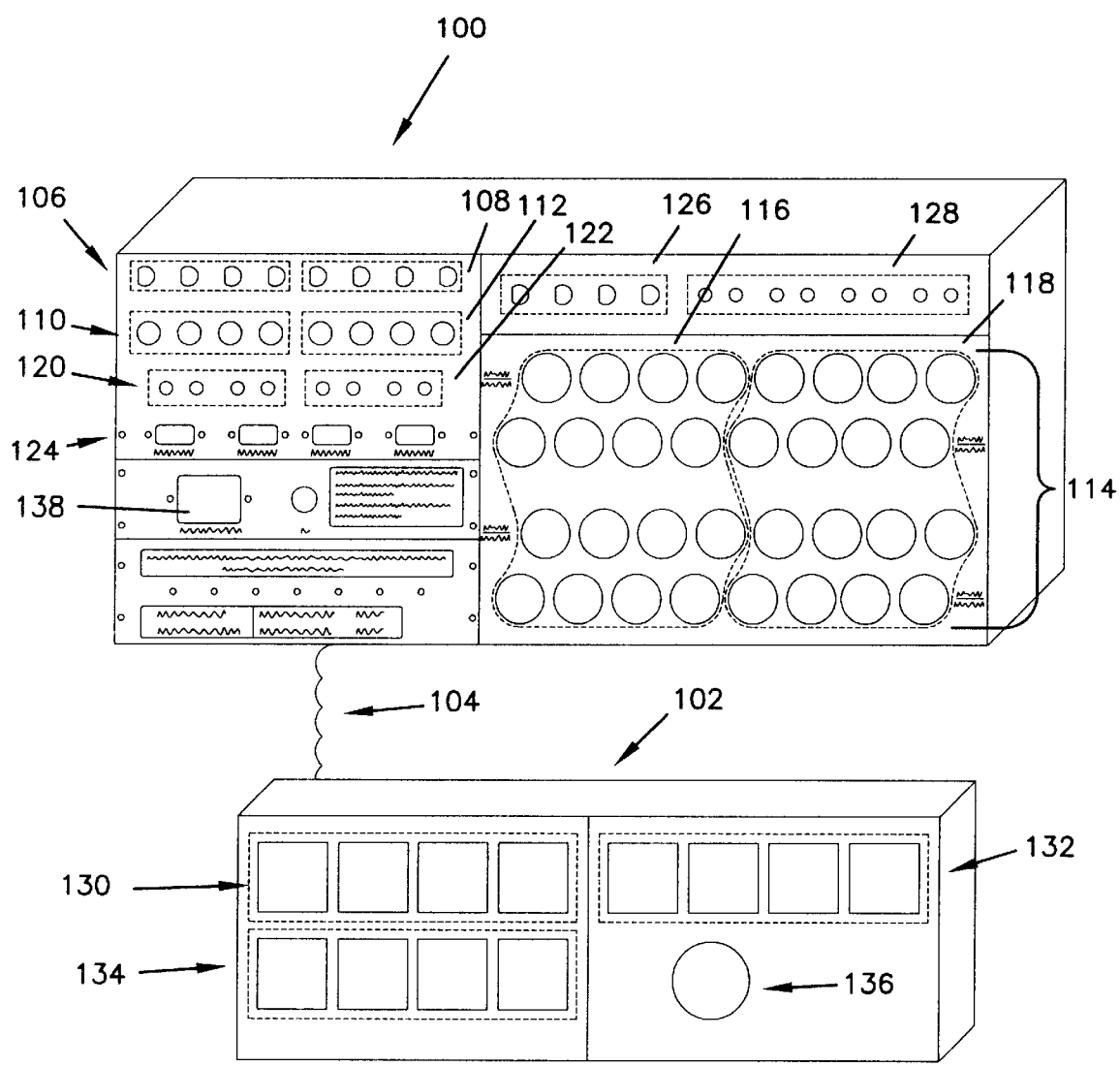
FIG. 1 is a diagram of the hardware of this invention.

The switching device of the present invention, as shown in an exemplary embodiment illustrated in FIG. 1, is comprised of a main chassis 100 and a control panel 102, wherein the main chassis 100 may be placed behind the operator's station and the control panel 102 may be on the operator's desk. The main chassis 100 is connected to the control panel 102 through a control cable 104. The switching device is comprised of a plurality of switching subsystems, wherein each of the switching subsystems allows an operator to select an input signal from among a first plurality of inputs, select an output signal from a second plurality of outputs, and couple the selected input signal to the selected output signal. In the preferred embodiment, each of the switching subsystems handles a different signal type. Generally, the signal types are selected from a group comprising composite video signals, S-video signals, audio signals, time code signals, and control signals, although those skilled in the art will recognize that other signal types may be selected as well.

The main chassis 100 has four composite video input ports 106 and four composite-video output ports 108. These ports 106 and 108 use BNC connectors to connect to video devices, such as video recorders, etc. Any one of the four input ports 106 can be connected to any one of the four output ports 108.

The main chassis 100 has four S-video input ports 110 and four S-video output ports 112. These ports 110 and 112 use DIN connectors to connect to video devices, such as video recorders, etc. Any one of the four input ports 110 can be connected to any one of the four output ports 112.

The main chassis 100 has four sets of audio ports 114, comprising four channels labelled in the drawing as audio channels 1, 2, 3, and 4. Each of the sets 114 comprises four audio input ports 116 and four audio output ports 118. Within each set 114, any one of the four input ports 116 can be connected to any one of the four output ports 118.

The main chassis 100 has four time code input ports 120 and four time code output ports 122. These ports 120 and 122 use RCA connectors to connect to devices that either generate or receive SMPTE time codes to synchronize their operations. Any one of the four input ports 120 can be connected to any one of the four output ports 122.

The main chassis 100 has four RS-422 full-duplex serial ports 124. These ports 124 use 9-pin D-type connectors to connect to both control and peripheral devices, such as computers, peripheral devices, etc., wherein the control devices can control the operation of the peripheral devices. Any one of the four ports 124 can be connected to any one of the ports 124.

The main chassis 100 also has four auxiliary composite video input ports 126 and four two-channel auxiliary audio input ports 128. These additional ports allow the input of additional video and audio source material.

The control panel 102 has four main source buttons 130, four auxiliary source buttons 132, and four destination buttons 134. The main source buttons 130 control the selection of input ports for the composite video ports 106, the S-video ports 110, the audio ports 116, the time code ports 120, and the serial ports 124. The destination buttons 134 control the selection of output ports for the composite video ports 108, the S-video ports 112, the audio ports 118, the time code ports 122, and the serial ports 124. The auxiliary source buttons 132 control the selection of the auxiliary video input ports and the auxiliary audio input ports.

In order to select material from a source device and provide the material to a destination device, the operator selects one of the main source buttons 130 or one of the auxiliary source buttons 132, and one of the destination buttons 134. As a result of this selection, the video, audio, and control output signals from the source device is directed toward the video, audio and control inputs of the destination device.

In addition, the control panel 102 has a loop warning light 136 that indicates when the operator has selected the same destination device as source device. When the operator selects identical source and destination devices, the loop warning light 136 flashes and the main chassis 100 does not close the switch, thus preventing possible feedback.

Finally, the main chassis is powered by 110 V AC power supplied via a standard electrical cable plugged into grounded socket 138.

Figure 2:
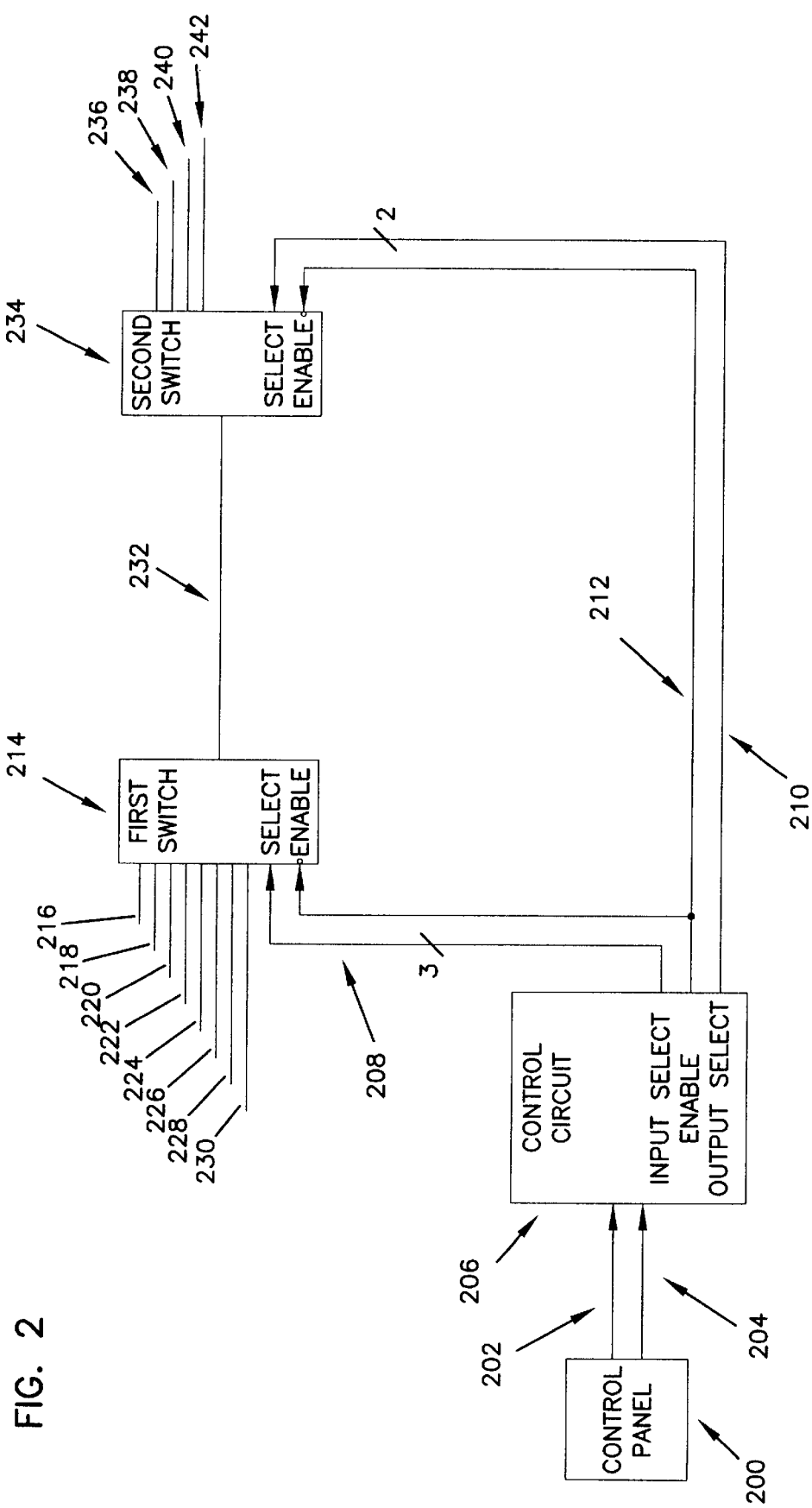
FIG. 2 is a block diagram illustrating the operation of a switch of this invention.

FIG. 2 is a block diagram of an exemplary circuit implementing the functions of a control circuit and a switching subsystem according to the present invention. In the preferred embodiment, a single control circuit is used to control all of the switching subsystems. However, a separate switching subsystem is provided to switch each of the composite video ports 106 and 108, the S-video ports 110 and 112, the audio ports 116 and 118, the time code ports 120 and 122, the serial ports 124, the auxiliary video input ports 126 and the auxiliary audio input ports 128. All of the switching subsystems are similar, but some changes to the switching subsystem would be required depending on the type of signals being switched.

The control panel 200 generates both a source select signal 202 and a destination select signal 204 to a control circuit 206. In the preferred embodiment, the source select signal 202 comprises an 8-line signal indicating which of the four main source buttons 130 and four auxiliary source buttons 132 have been selected. Also, in the preferred embodiment, the destination select signal 204 comprises an 4-line signal indicating which of the four destination buttons 134 have been selected.

The control circuit 206 receives the source select signal 202 and the destination select signal 204 and encodes these signals into a 3-bit input select signal 208, a 2-bit output select signal 210, and an enable signal 212. The 3-bit input select signal 208 has a value corresponding to which of the 8 lines of the source select signal 202 has been selected, e.g., if line 5 is selected, then the 3-bit input select signal 208 has a value of 101 (binary) or 5 (decimal). Similarly, the 2-bit output select signal 210 has a value corresponding to which of the 4 lines of the destination select signal 204 has been selected, e.g., if line 2 is selected, then the 2-bit output select signal 210 has a value of 10 (binary) or 2 (decimal). The enable circuit ensures that the same source and destination devices have not been selected by the operator. These signals are then used to control the other elements of the circuit.

The 3-bit input select signal 208 causes switch 214 to select among the four or eight output signals 216, 218, 220, 222, 224, 226, 228 and 230 from four or eight sources, such as video tape recorders, to generate a single source signal 232. The switch 214 comprises an 8-to-1 selector, as is well known in the art. In the present invention, four signals are switched for the S-video ports 110, the time code ports 120, and the serial ports 124, while eight signals are switched for the composite video ports 106 and the auxiliary video input ports 126, and the audio ports 116 and the auxiliary audio input ports 128.

The single source signal 232 is input to a second switch 234 controlled by the 2-bit output select signal 210. The 2-bit output select signal 210 causes switch 234 to select among the four output signals 236, 238, 240 or 242 to four destinations, such as video tape recorders. The switch 234 comprises a 1-to-4-selector (or 1-to-8 selector with only 4 outputs), as is well known in the art.

For both the first and second switch 214 and 234, the control circuit 206 also provides an enable signal 212 to enable switching when it is determined that the operator has not selected identical source and destination devices on the control panel 102. If the operator does select identical source and destination devices, the enable signal 212 is disabled by the control circuit 206 to disable the operation of the first and second switches 214 and 234.

Figure 3:
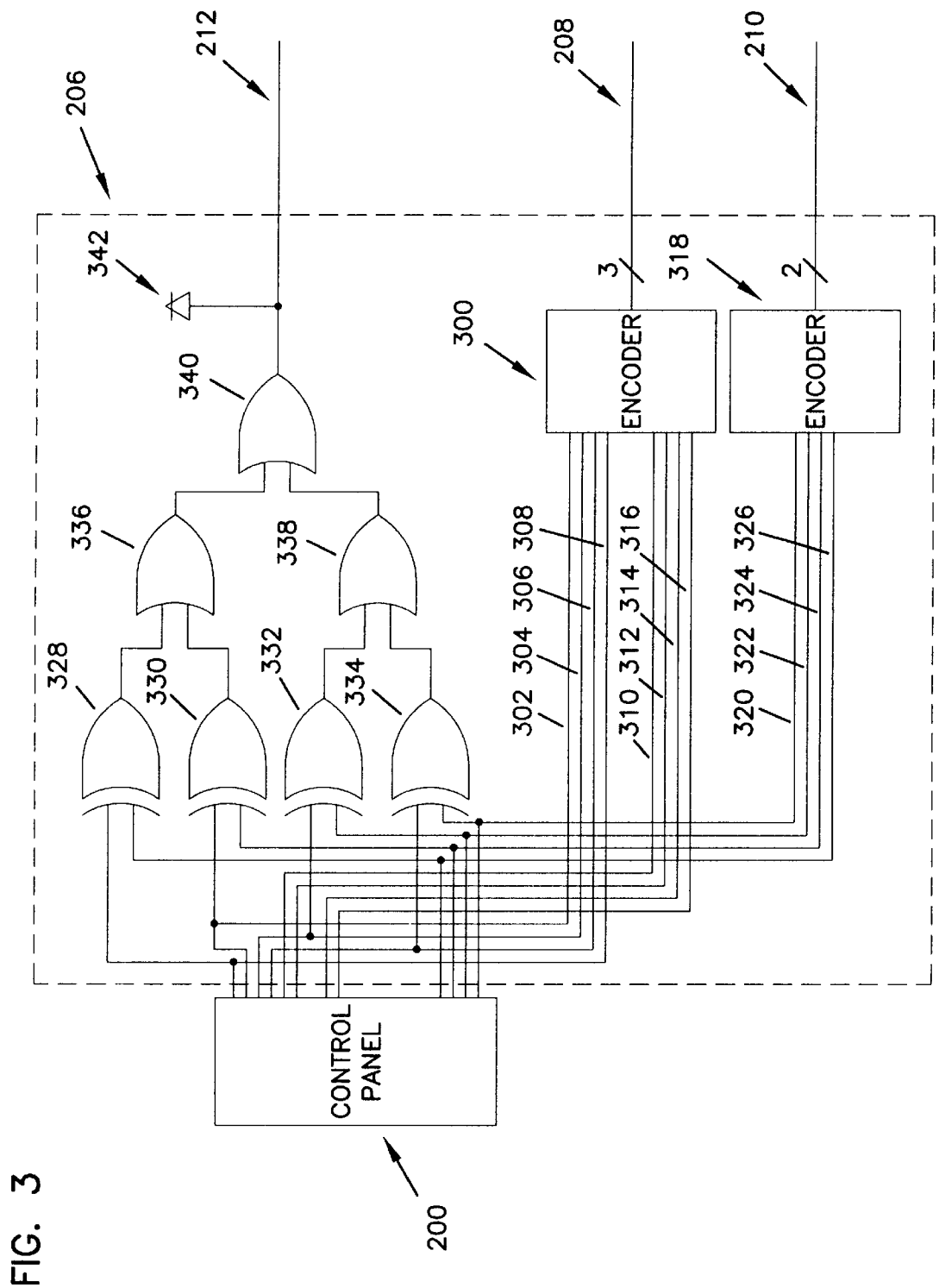
FIG. 3 is block diagram illustrating the operation of the control circuit of this invention.

FIG. 3 is a block diagram of an exemplary embodiment of the control circuit 206. As described above, the control panel 200 generates both a source select signal 202 and a destination select signal 204 to a control circuit 206. In the preferred embodiment, the source select signal 202 comprises an 8-line signal indicating which of the four main source buttons 130 and four auxiliary source buttons 132 have been selected. Also, in the preferred embodiment, the destination select signal 204 comprises an 4-line signal indicating which of the four destination buttons 134 have been selected.

The control circuit 206 receives the source select signal and the destination select signal and encodes these signals into a 3-bit input select signal 208, a 2-bit output select signal 210, and an enable signal 212. Encoder 300 encodes the input source selection signals 302, 304, 306, 308, 310, 312, 314, and 316 to provide the 3-bit select signal 208; encoder 318 encodes the destination selection signals 320, 322, 324, 326 to provide the 2-bit output select signal 210. For example, if the input selection signal 306 is high, and thus the seven remaining input selection signals 302, 304, 308, 310, 312, 314, and 316 are low, the encoder 300 will provide a 3-bit input select signal 208 represented by 010.

Control circuit 206 includes the logic to indicate the loop warning when the operator selects identical source and destination devices. In one embodiment of this invention, as illustrated in FIG. 3, control panel 102 provides source selection signals 302, 304, 306, and 308 to XOR gates 328, 330, 332, and 334. Control panel 200 provides destination selection signals 320, 322, 324, and 326 to XOR gates 302, 304, 306, and 308. The XOR gates 302, 304, 306, and 308 in combination with OR gates 336, 338, and 340 determine if the operator selects identical source and destination devices. If so, an LED 342 warns the operator and an enable signal 212 is provided to the switches to prevent the switches from making the switch. Thus, possible feedback is prevented because the control circuit 206 will not permit a source device to have its inputs and outputs coupled together.

This concludes the description of the preferred embodiment of the invention. The following paragraphs describe some alternative methods of accomplishing the same objects.

Those skilled in the art will recognize that the loop warning device could be implemented using a buzzer or voice message or other audible warning to indicate to the operator that an identical source and destination device has been selected. Furthermore, the loop warning light could be positioned on the control panel, on the main chassis, or mounted to another structure for the convenience of the operator.

Those skilled in the art will recognize that the switching functions of this invention could easily be modified to provide switching between more or less than the eight source devices and four destination devices of this embodiment. Furthermore, additional switches could be added to the chassis to accommodate additional signals beyond the composite video signals, S-video signals, audio signals, time code signals, and serial data control signals of the present embodiment.

Those skilled in the art will recognize that the function of the control panel could be implemented through a variety structures for the convenience of the operator. The control panel could provide wireless transmission to the main chassis or the function of the control panel could be provided by a software program running in the memory of a computer.

In summary, the present invention describes a switching device for selecting among remote input and output audio, video, and control devices. As an editing switch, the present invention allows an operator to easily select a source device and a destination device. Further, the present invention provides for simultaneous switching of the video, audio, and control signals from a source device to a destination device. In addition, the present invention provides a loop warning light that indicates when the operator chooses a destination identical to the source.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for switching analog and digital signals, comprising one or more switching circuits for selecting an input signal from among a plurality of inputs, for selecting an output signal from a plurality of outputs, for encoding the selected input signal, and for coupling the encoded selected input signal to the selected output signal, wherein each of the switching circuits handles a different one of a plurality of signal types and the signal types are selected from a group comprising composite video signals, S-video signals, audio signals, time code signals, and control signals.

2. The apparatus of claim 1, further comprising a control panel coupled to the switching circuits for controlling the selection of the input and output signals.

3. The apparatus of claim 1, further comprising means for enabling the switching circuits only when the selected input signal is not coupled to an identical device as the selected output signal.

4. An audio/video/control switching apparatus, comprising:

a plurality of switching subsystems, each of the switching subsystems comprising means for selecting an input signal from among a plurality of inputs, for selecting an output signal from a plurality of outputs, for encoding the selected input signal, and for coupling the encoded selected input signal to the selected output signal, wherein each of the switching subsystems handles a different one of a plurality of signal types, and the signal types are selected from a group comprising composite video signals, S-video signals, audio signals, time code signals, and control signals; and control means, coupled to the switching subsystems, for controlling the selection of the input and output signals.

5. The audio/video/control switching apparatus of claim 4, wherein the control means further comprises means for accepting operator input from a control panel and for controlling the selection of the input and output signals in response thereto.

6. The audio/video/control switching apparatus of claim 4, further comprising means for enabling the switching subsystems only when the selected input signal is not coupled to an identical device as the selected output signal.

7. A method of switching analog and digital signals, comprising the steps of selecting an input signal in a switching circuit from among a plurality of inputs to the switching circuit, selecting an output signal in the switching circuit from a plurality of outputs from the switching circuit, encoding the selected input signal, and coupling the encoded selected input signal to the selected output signal in the switching circuit, wherein each of the switching circuits handles a different one of a plurality of signal types and the signal types are selected from a group comprising composite video signals, S-video signals, audio signals, time code signals, and control signals.

8. The method of claim 7, further comprising the step of enabling the switching circuits only when the selected input signal is not coupled to an identical device as the selected output signal.

* * * * *